Dec. 8, 1925.
1,564,366
J. H. OVERTON
DIES FOR AND METHOD OF FORMING HOLLOW RUBBER ARTICLES
Filed March 19, 1924
3 Sheets-Sheet 1

Dec. 8, 1925.                                           1,564,366
J. H. OVERTON
DIES FOR AND METHOD OF FORMING HOLLOW RUBBER ARTICLES
Filed March 19, 1924          3 Sheets-Sheet 3

Inventor
J. H. Overton

Watson E. Coleman
Atty

Patented Dec. 8, 1925.

1,564,366

UNITED STATES PATENT OFFICE.

JOHN H. OVERTON, OF TRENTON, NEW JERSEY.

DIES FOR AND METHOD OF FORMING HOLLOW RUBBER ARTICLES.

Application filed March 19, 1924. Serial No. 700,252.

*To all whom it may concern:*

Be it known that I, JOHN H. OVERTON, a citizen of the United States, residing at Trenton, in the county of Mercer and State of New Jersey, have invented certain new and useful Improvements in Dies for and Methods of Forming Hollow Rubber Articles, of which the following is a specification, reference being had to the accompanying drawings.

This invention relates to the production of hollow rubber articles, and particularly to such articles as syringe bulbs, balls, and the like.

At present such articles are made by the use of two female or cavity dies mounted upon the upper and lower platens of a press, and a sheet of stock is placed upon the lower die, a frame or plate is then disposed upon this sheet of stock, a second sheet of stock is placed upon the frame or plate, and then the two platens are forced together so as to press the stock against the intermediate plate or frame and each sheet of stock is forced into its corresponding die cavities as, for instance, by air pressure, by a core plate having dies thereon which engage the rubber stock, or by a vacuum which sucks the rubber stock into the cavities of the die.

In each of these cases, it will be noted that an intermediate member is employed which separates the two sheets of stock, and in the use of this method of making balls or other hollow rubber articles, the platens to which the dies are attached are brought together to force the sheets into contact with the intermediate member and, where air pressure is employed to force the sheets of stock around the margins of the die into airtight contact with the intermediate plate or frame, the stock is then forced into the cavities, the press platens are shifted away from each other, and the intermediate frame or plate removed. Ammonia cubes, water, or other gas or steam-forming material are then placed in the depressions of the stock, the press platens are again brought together, which brings the two sheets of stock together, and the cutting edges of the die cavities, that is the cutting edges which define the die cavities, cut out the two halves from the sheets and press the edges of the two halves into adhering contact to thus form the biscuit, the platens are then opened, and the surplus stock and the biscuits removed. This involves two opening movements of the press platens, two closing movements of the same, the removal of the intermediate member, and the insertion of the ammonia cubes or other gas-forming material which is rendered necessary in the subsequent vulcanizing.

An object of the present invention is to provide an apparatus of the character described whose use does not involve but one closing and opening movement of the press platen and which permits the dropping of the ammonia cubes within the closed dies without opening the dies, that is without moving the press platens away from each other.

A further object is to provide a device of this character which is so constructed that it is very effective for the purpose intended, wherein a tight seal is made around the margin of the stock at the time that the stock is being forced outward into the die cavities, and further in which the die cavities are so formed that the stock will not become released from the die cavities and move out of the same when the means for injecting air and for dropping the ammonia is removed from between the dies.

A still further object is to provide a device of this character wherein air is injected between the dies to force the stock out into the die cavities by means of a tubular member connected to a source of air under pressure, this tubular member being preferably made in two sections and one of said sections being formed to provide a dropper for gas-forming material.

Another object is to so form the die cavities that the stock will be held in the die cavities after it has been blown therein, and furthermore to so form these die cavities that they will prevent any thin spots in the stock and will cause the air to force the two hemispherical sections into tight contact with each other.

Other objects will appear in the course of the following description.

My invention is illustrated in the accompanying drawings, wherein:—

Figure 3ª is a sectional view of the valve 28, the section being taken on a horizontal plane;

Referring to these drawings, 10 designates one of a pair of dies, the other of which is designated 11. These dies are coacting confronting dies, one of them being intended to be attached to the bed plate or platen of a press, while the uppermost die is attached to the uppermost platen of a press in any suitable and usual manner. The uppermost die is formed with a downwardly extending marginal flange or wall 12 which extends entirely around the die, this die being illustrated as rectangular, while the lowermost die is provided with a marginal, upstanding wall 13 disposed inward of the marginal wall 12. The wall 13 is cut out at 14 at a plurality of points and on the opposite side walls for the passage of the air pipe and ammonia dropper, as will be later described, while the marginal wall 12 is also cut out at a plurality of points, as at 15, for the same purpose.

Figures 3, 4, 5, 6, 7:
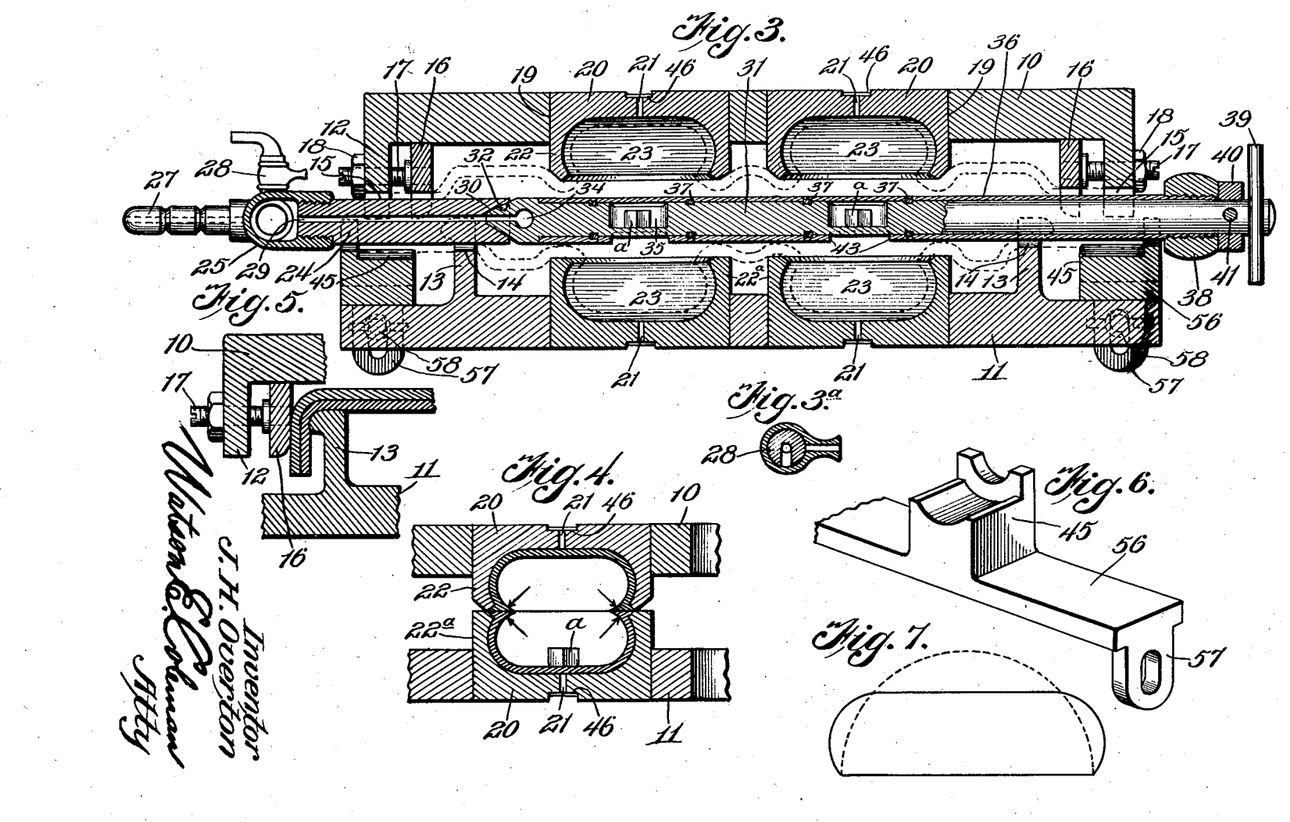
Figure 3 is a section on the line 3—3 of Figure 1, the position of the stock after having been forced into the cavities being indicated in dotted lines.
Figure 4 is a sectional view showing the stock after the dies are closed and after the air injecting and ammonia dropping devices have been withdrawn from between the dies.
Figure 5 is a fragmentary section on the line 5—5 of Figure 1, showing the manner in which the stock is clamped against the wall.
Figure 6 is a perspective view of the means for supporting the air pipe and ammonia dropper.
Figure 7 is a diagrammatic view illustrating the manner in which the undercut wall of the cavity compensates for the shallowness of the die, the dotted lines illustrating the normal form of a die, while the full lines illustrate the form of the die in my case.

It will be noted from Figure 3 that the wall 12 is entirely exterior to the wall 13 and that when the upper die 10 is brought down in proper position upon the lower die, the walls will overlap. Preferably, and for a reason to be later stated, an adjustable gib 16 is mounted against the inner face of the wall or flange 11 and is supported by means of adjusting screws 17 having lock nuts 18 holding the screws in adjusted position. It may be remarked that these gibs are for compensating for different thicknesses of stock so that the stock will be clamped surely and firmly between the rounded face of the gib 16 and the rounded face of the upwardly projecting flange 13 when the stock is held in place between the dies. Each of these dies is formed with a plurality of sockets 19 within which is fitted and held a die element 20. I have illustrated four of these die elements which define die cavities as disposed within the body of the die 10, but it will be understood that a die might be formed with only one die cavity and, therefore, with only one die element or with any number of die cavities and die elements.

It will also be understood that the die element 20 might be formed integral with the die body 10, though it is more convenient to make the die element in a separate insert. Each of these die elements 20 is formed with a plurality of vents 21 in the bottom of the die element. The bottom and top die elements are precisely the same and each of the upper die cavities is defined by a projecting rib 22 having oppositely beveled cutting faces, while each lower die cavity is defined by a rib 22¹ having a flat or horizontal upper edge and a beveled inner edge. I do not wish to be limited to the exact form of the cutting and clamping jaws shown on these two meeting dies.

It is to be particularly noted that each die element 20 is formed with a cavity 23 which is relatively shallow and flat bottomed and that the peripheral wall of each die cavity is undercut so that half way between the bottom of the die cavity and the cutting edge or shoulder of the rib the interior diameter of the die cavity is greater than the diameter of the die cavity at the cutting edge or rim. The purpose of this will be later stated. I do not wish to be limited to the use of this particular form of die cavity in connection with the mechanism now to be described, though for certain reasons which will be stated, this is preferable.

Figure 2:
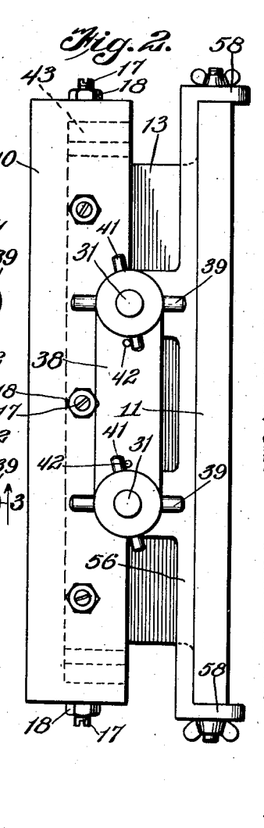
Figure 2 is a side elevation of the dies.

Coacting with the upper and lower dies and insertible through the slots or notches 14 and the slots or notches 15 is a combined air tube and ammonia dropper. I have illustrated two air tubes 24, each air tube being connected by an elbow 25 to a T 26, in turn connected to a nipple 27, which may be connected by a flexible pipe to any suitable source of air under pressure. An air relief 28 controls the relief of air from the T 26 and, therefore, from the interior of the dies. The air pipe 24 has a longitudinally extending bore 29, and the extremity of the air pipe is formed with a conical recess 30. Insertible through the notches 14 and 15 from the opposite side of the dies is the ammonia dropper, designated generally 31. There are two of these droppers corresponding to the two air pipes 24 and disposed immediately opposite these air pipes and in alignment therewith, each of these droppers consisting of a metal rod, circular in cross section, the extremity of each rod being tapered so as to fit in the conical recess 30, as at 32, and each rod having at its tapered end a longitudinally extending bore 33 opening into a transverse aperture 34 which extends transversely through the rod and opens into the space between the two dies, as illustrated in Figure 2.

Figure 1:
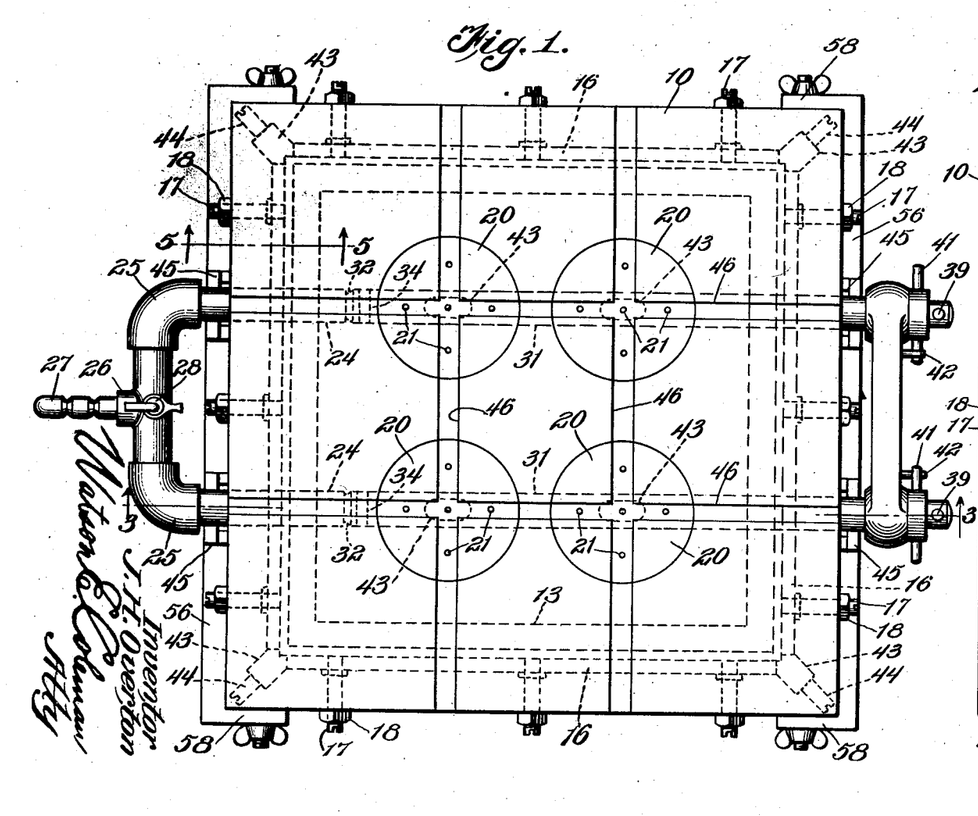
Figure 1 is a top plan view of a mechanism of the character described.

Each rod 31 is formed at two points coinciding with the lower die cavities with pockets or recesses 35, and surrounding the rod and embracing the reduced portion of this rod and abutting against the tapered head is a sleeve 36, this sleeve being fixed with relation to the rod so that the rod can rotate within the sleeve, but any longitudinal movement of the rod will withdraw the sleeve with the rod or insert the rod and the sleeve. Preferably packing rings 37 are disposed at each side of each pocket 35 so that these pockets or recesses might be used to hold drops of water. The outer end of each sleeve is engaged with a yoke 38, and each rod 31 extends out beyond this yoke and carries a handle 39. Between the handle 39 and the yoke 38 there is disposed a washer 40 which is pinned to the rod 31 by a pin 41 which projects beyond the washer, as illustrated in Figure 1, and which is adapted to abut against a stop 42 when the rod has been turned so as to cause the pockets or recesses 35 to coincide with the slots 43 formed in the sleeve.

In the operation of the device which has so far been described, the platens of the press are moved apart and a sheet of stock is laid upon the lower die 11, this sheet of stock having its margin extended beyond the walls 13 on all sides. Disposed through the notches 14 are the air tubes 24 and the ammonia droppers 31. The upper sheet of stock is then laid over the lower sheet and, of course, above the ammonia dropper and the air tubes 24. The press is then operated to force the platens together and the two sheets of stock at their margins are forced down, as illustrated in Figure 5, over the rounded corners of the flange or wall 13 and against the rounded corners of the gibs 16 until an air-tight connection is formed between the rubber and around the members 24 and 31. When this has occurred, the air cock 28 being closed, air is allowed to enter through the duct 29 and pass into the space between the sheets of stock or rubber through the duct 30. The two sheets of stock are then forced by fluid pressure against the lower and upper dies respectively and into the die cavities 23 of the upper and lower dies, the stock taking the approximate form of these die cavities.

When this has occurred, the ammonia dropper 31 is rotated until the pin 41 comes against the stop 42 and this causes the "pill" a or ammonia cube to be discharged into the concavity formed in the lower sheet of stock within each die cavity, as illustrated in Figure 4. When the ammonia cubes have been so discharged, the members 31 and 24 are withdrawn from between the dies, the air acting to immediately press the sheets of rubber into close contiguity at the points where the members 24 and 31 have been withdrawn and the air being, of course, trapped inside the dies. However, it may be pointed out that inasmuch as the air has done its work, that is has forced the stock into the die cavities, and leakage of air, when the members 24 and 31 are withdrawn, is of very little, if any, importance. This is particularly the case in view of the fact that each die cavity is undercut so that it tends to hold the stock within the die cavity and prevent flattening out of the die cavity. The retraction or withdrawal of the members 31 and 24 is done without the necessity of shifting the die platens away from each other and as soon as these members are withdrawn, power is applied to the press to force the sections 10 and 11 toward each other until the two sheets of stock are pressed against each other by the rods 20 of the upper die cavity coming in contact with the rods 20 of the lower die cavity. This causes the two hemispherical sections to be forced into tight adhering contact around their edges and then as the die still move further toward each other the beveled edges cut off these sections so as to leave two joined hemispheres of rubber or stock which thus forms what is known as a biscuit or bladder, each biscuit having therein an ammonia cube a. When these biscuits are vulcanized in a vulcanizing mold, which vulcanizing mold has the shape of the final article, the ammonia cube forms a gas which expands the biscuit into tight fitting contact with the interior of the vulcanizing mold so that the biscuit will take the shape of the vulcanizing mold and the exterior of the biscuit will taken any ornamental configuration which may be formed upon the interior of the vulcanizing mold.

As before remarked, the purpose of the gib 16 is to provide an adjustable wall which may be forced inward so as to decrease the distance between the corner of this adjustable wall and the rounded corner of the wall 13. It is to be particularly noted that after the air has been forced into the dies so as to force the rubber into the die cavities, there is no longer any necessity of retaining the air within the dies, as the rubber so forced into the die cavities will not again come out. This is particularly true because of the fact that the undercutting of each die cavity tends to hold the rubber or stock into the respective die cavity.

At the corners of the die members 10 and 11 where adjustable gibs are used, there are disposed adjustable corner gibs 43, these gibs having their inner end faces disposed in right angular relation to each other so that the gibs 16 may be forced directly inward. Screws 44 are used to force the gibs 43 inward just as the screws 17 are used to force the gibs 16 inward. Preferably the die member 11 is extended outward beyond the die member 10 or beyond the flange 12 and a seat 45 is disposed on this projecting portion which is recessed to receive the tubular member 24 and the member 31. Preferably also the upper and lower faces of the die members 10 and 11 are transversely grooved, as at 46, the vent openings 21 opening into this groove so that when the dies are placed against the platens, the outward venting of the air from the interior of the die cavities will not be prevented.

In Figures 8 to 11, I show a modified form of die press in which the margins of the rubber sheets are yieldingly held pressed against each other by means of springs, but otherwise than this the construction shown in Figures 8 to 11 is the same in general structure and operation as that shown in Figures 1 to 7. In these figures, 47 designates the die body which may have either a plurality or a single cavitary die insert 48 having a plurality of vents 49 from each cavitary die. Each cavitary die 48 is formed in the same manner as heretofore described, that is with a relatively shallow recess or concavity shallower than the depth of the hemispherical article to be made thereby, and each die cavity is formed with a projecting annular rib 50 which is beveled to cutting edges, as heretofore described. The two die bodies 47 are the same in structure and each die body is formed around its margin adjacent the face directed away from the opposite die body with a marginal flange 51, and seating within this marginal flange is a frame 52 which is shown as rectangular inasmuch as the die body is rectangular. The frame 52 is the equivalent of the flanges 12 and 13 and the members 45 in Figures 1 to 3, in that these elements 52 clamp the margins of the rubber sheets and force the rubber sheets against each other and hold the rubber sheets tightly around the members 24 and 31.

Figure 8:
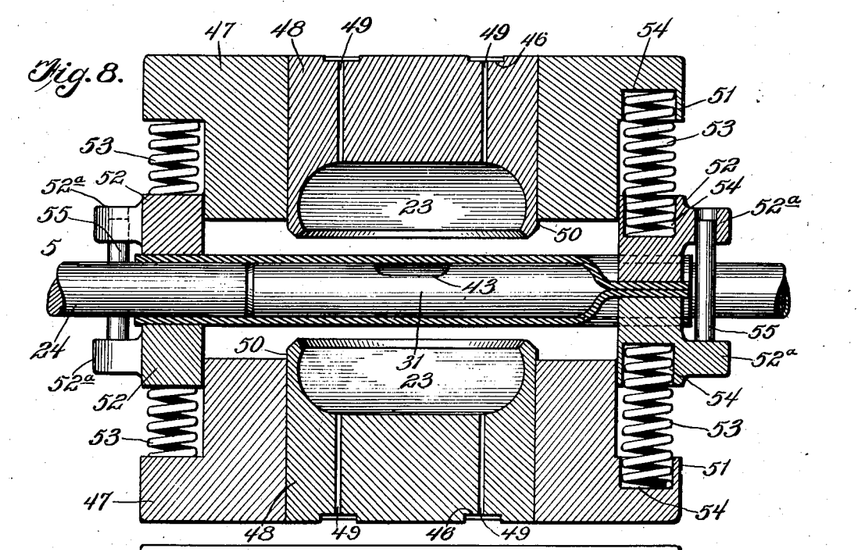
Figure 8 is a vertical sectional view on the line 8—8 of Figure 10.
Figures 9, 10:
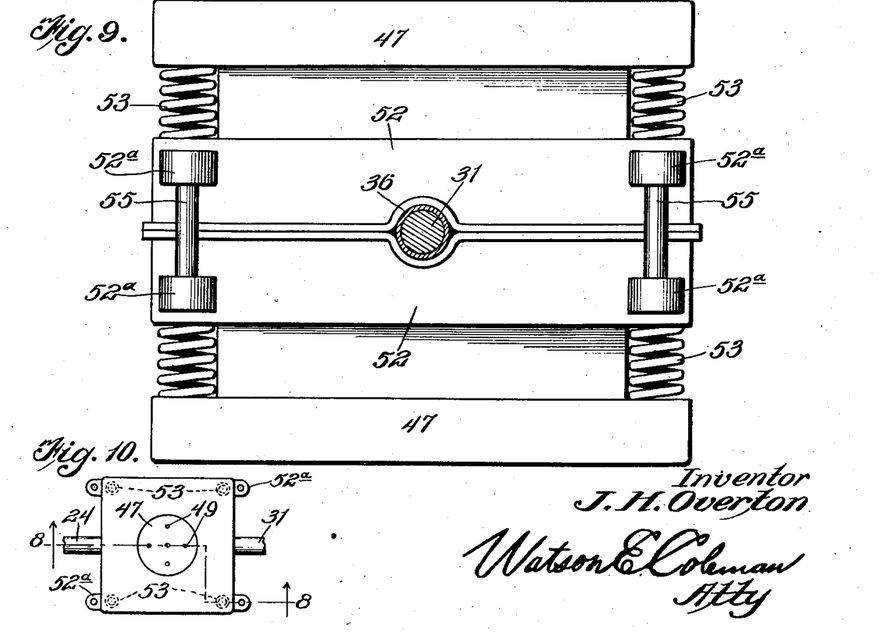
Figure 9 is an end elevation of a die constructed in accordance with Figure 8.
Figure 10 is a top plan view of the die shown in Figures 8 and 9.

Disposed at the corners of each of the die bodies and bearing against the corners of the frame are the compression springs 53 which may be pinned or otherwise attached each at one end to the die body and at the other end to the corresponding frame. These frames have flat confronting faces and each frame and the corresponding die body is socketed, as at 54, to receive the ends of the springs. Preferably each of the frames 52 is provided with a pair of outwardly projecting lugs 52ᵃ, one of these lugs carrying dowel pins 55 which enter an opening in the corresponding lug 52ᵃ so that the two frames are guided with relation to each other and cannot tip or turn.

In the use of this device, the lower sheet of stock is disposed upon the lower frames, the members 31 and 24 are disposed upon the lower sheet of stock, the upper sheet of stock is laid upon the top of these members 31 and 24, and then the platens of the press are hydraulically moved toward each other until the frames 52 clamp the sheet between the confronting faces of the frames and around the air tube and the ammonia dropper 31. The margins of the sheets of stock are thus clamped in air-tight, adhesive relation. The air is then admitted by turning the cock 28 and thus blows the sheets of rubber apart, forcing each sheet of stock into its corresponding die cavity and into conforming relation thereto. After this has been done, the member 31 or dropper is turned so as to discharge a pill of ammonia into the lower die cavities and then the air pipe and the ammonia dropper are withdrawn from engagement with each other. The platens of the press are then forced further toward each other, which causes the compression of the springs 53, and eventually the cutting ribs or cutting edges of the die cavities press the edges of the rubber which is to form the completed hemispherical blanks into adherent contact with each other and eventually cuts off the blank, thus leaving a hollow ball or like hollow object within the dies. The dies are then opened, as before described, and the balls and the surplus stock are taken out and the process repeated.

It will be seen that the mechanism illustrated in Figures 8 to 10 is precisely the same as that illustrated in the prior figures, except as regards the frame 52 which causes the sheets of stock to be brought into airtight engagement with each other.

While I have referred to the use of ammonia cubes as a means for expanding the stock within the vulcanizing mold, I do not wish to be limited thereto as it is obvious that water might be used, as heretofore stated, within the pockets or recesses 35, this water or other liquid being vaporized under the heat of the vulcanizing mold so as to expand and cause the expansion of the rubber stock into conforming relation to the vulcanizing mold.

Attention is particularly called to the shape of the die cavity. It will be noted that these cavities are relatively shallow, as before stated, in comparison with the depth of the hemispherical article to be produced (if a hemispherical article is to be produced) but that just half way above the cutting edge the interior diameter of the die cavity is increased. The purpose of this peculiar shape is to prevent any thin spots being formed in the rubber stock, as if the die cavities extended upward for the full height of the article which is formed in the die, the upper portion of the rubber where the greatest stretching occurs is liable to be thin, but with the construction which I have illustrated the middle portion of the rubber is not overstretched because of the flatness of the die at this point and yet sufficient stock is forced into the die cavity so that the completed biscuit will have sufficient stock in it to form a sphere (or other shaped article) when the biscuit is placed in the vulcanizing mold. Furthermore, the undercutting of the die acts to hold the stock within the die and tends to prevent its removal from the die when the air is allowed to escape in removing the tubes 24 and 31. Again this particular shape, as illustrated in Figure 4, causes the compressed air within the two conjoined rubber hemispheres to press outward at the joint and press the two parts together, thus preventing any protrusion of the rubber at this point.

While I have illustrated this peculiar shaped die cavity in conjunction with dies intended to be used with the members 31 and 24, I do not wish to be limited to this use as these peculiar die cavities might be used in connection with ordinary dies, that is dies wherein the rubber stock is forced into the die cavities by air pressure or by vacuum, then the dies opened and the ammonia pills dropped into the lower die cavities and the dies again closed and pressed together.

The peculiar advantage of this construction over the dies heretofore used for this purpose resides very largely in the saving of time, as once the dies are moved toward each other they do not have to be shifted away from each other in order to permit the withdrawal of a frame, plate or the like. This moving of the dies away from each other to permit the removal of the plate and then the moving of the dies again toward each other constitutes a considerable waste of time, and this is also true of the sprinkling of ammonia cubes or drops of water or other liquid within the half balls that have been formed. With my construction there is one continuous movement of the dies and merely a slight and short halt sufficient to withdraw the members 31 and 24 from between the dies until the articles have been completed and the dies are entirely separated from each other to permit the withdrawal of the surplus stock and of the articles formed therefrom.

I have used the term "gas-forming" material to include water or other liquids or solids which will vaporize and expand when submitted to the action of the heat in the vulcanizing mold, though strictly speaking steam or other vapors are not gases. I have used the term because it is one which is common in the art.

While I do not wish to be limited to any specific means for supporting the ammonia dropper and the air tube, I have preferably used the device shown in Figure 6, in which the seat 45 is mounted upon and is integral with a plate 56 which rests upon the projecting margin of the lower die outward of the wall 13, this member 56 at one end being provided with a downwardly depending slotted lug through which a screw 58 passes into the body of the die to thus adjustably hold the member 56 on the die and permit the member 56 to be raised or lowered. Any suitable seats for the pair of ammonia droppers and for the pair of air inlet pipes may be used, however, but the construction which I have described permits the member 56 to be temporarily turned over and out of the way or in other words temporarily moved out of position in order to permit the two die members to close together and complete the operation or to be turned out of the way whenever it is desired. While I have illustrated these seats as being adjustably mounted upon the lower die, I do not wish to be limited thereto as it is obvious that the seats might be integral with or otherwise connected to the die.

The purpose of the air relief valve 28 is to permit the release of air from between the two sheets of rubber after they have been blown into the die cavities and before removing the air tube 24 or the dropper 31.

I claim:—

1. A method of making hollow rubber articles which consists in disposing between two cavitary dies two confronting sheets of stock, forcing the dies toward each other to bring the margins of the stock into air-tight engagement with each other, causing the stock to enter the die cavity by fluid pressure, and then continuing the movement of the dies toward each other to thereby bring the sheets into adhering contact at the cutting edges of the dies and cut out the article from the surplus stock.

2. A method of making hollow rubber articles which consists in disposing between two cavitary dies two confronting sheets of stock, forcing the dies toward each other to bring the margins of the stock into air-tight engagement with each other, causing the stock to enter the die cavities by fluid pressure, disposing gas-forming material within the depression in the lower sheet of the stock while the sheets of stock are in contact with each other, and then continuing the movement of the dies toward each other to thereby bring the sheets into adhering contact at the cutter edges of the dies and cut out the article from the surplus stock.

3. A method of making hollow rubber articles which consists in disposing between two cavitary dies two confronting sheets of stock, disposing an air tube between the two sheets, causing the dies to move toward each other to thereby bring the margins of the stock into air-tight engagement with each other, admitting air to the tube to force the stock to enter the die cavities by fluid pressure, withdrawing said air tube, and then continuing the movement of the dies toward each other to thereby bring the sheets into adhering contact with the cutting edges of the dies and cut out the article from the surplus stock.

4. A method of making hollow rubber articles which consists in disposing between two cavitary dies two confronting sheets of stock, disposing between said sheets of stock an air inlet tube and a dropper having recesses, one for each cavity in the die and adapted to contain gas-forming material, forcing the dies toward each other to bring the margins of the stock into air-tight engagement, permitting air to enter between the stock by means of the air tube to thereby cause the stock to enter the die cavities by fluid pressure, discharging gas forming material from the cavities of the dropper into each of the depressions in the lower sheet of stock while the dies are closed and the sheets of stock are in contact with each other, then removing the air tube and dropper by longitudinal movement, and then continuing the movement of the dies toward each other to thereby bring the sheets into adhering contact with the cutting edges of the dies to cut out the article from the surplus stock.

5. A die for forming one-half of a hollow rubber article formed to provide a cavity defined by a marginal raised cutting rib, the cavity being less in depth than the depth of the half section in its completed form but inward of the cutting edges being greater in diameter than the final diameter of the completed article.

6. A die for forming one-half of a hollow rubber article formed to provide a cavity defined by a raised cutting rib, the cavity being less in depth than the depth of the half section in its completed form but the bottom of the cavity being relatively flat, the cavity inward of the cutting edges being greater in diameter than the final diameter of the completed article.

7. A die for forming a rubber blank which, when completed, will be of hemispherical form, the die being formed to provide a cavity defined by a marginal raised cutting rib, the bottom of the cavity being flat and the cavity being less in depth than the depth of the half section in its completed form, the cavity inward of the cutting edges being greater in diameter than the final diameter of the completed article.

8. A die for forming a hemispherical blank for hollow rubber articles formed to provide a cavity defined by a circular, marginal, raised cutting rib, the cavity being less in depth than the depth of the half section in its completed form but inward of the cutting edges being greater in diameter than the final diameter of the completed article, the bottom of the cavity being flat and the side wall of the cavity from the cutting edge to the bottom being undercut and gradually curved from the edge of the cutting cavity to the bottom, the increased interior diameter of the cavity being equal to and compensating for the difference between the depth of the cavity and the depth of the completed article.

9. An apparatus for making hollow rubber goods comprising confronting cavitary dies, each cavity being defined by a raised cutting rib, the internal diameter of the cavity between the edge of the cutting rib and the bottom of the cavity being greater in internal diameter than the diameter of the cavity at the cutting rib.

10. In mechanism for forming hollow articles of plastic material, the combination with opposed cavitary dies and means for forcing two sheets of rubber stock in opposite directions into the cavities of said dies while said sheets are in contact with each other, of means disposed between the dies whereby gas-forming material may be deposited between the sheets of stock opposite each die cavity, said means being withdrawable from between the dies and the sheets of stock while the dies are closed and the sheets of stock are in contact with each other.

11. In mechanism for forming hollow articles of plastic material, the combination with two confronting cavitary dies adapted to clamp two sheets of stock between them with the sheets in air-tight engagement, of a circular member having recesses equal in number to the cavities of the dies and adapted to be disposed over the cavities in the lower die and to be inserted between the sheets of stock and to be withdrawn therefrom, said member being shiftable to cause the discharge of gas-forming material from said recesses onto the lower sheet of rubber at the die cavities.

12. In mechanism for forming hollow articles of plastic material, two confronting cavitary dies adapted to clamp two sheets of stock between them and hold the margins of the sheet in air-tight engagement, and a circular member insertible between the sheets and withdrawable therefrom, the circular member having recesses or pockets formed in its length equal in number to the cavities of the dies and registering therewith, the member being withdrawable from between the sheets of rubber and being shiftable to discharge gas-forming material onto the lower sheet of rubber in coincidence with each cavity.

13. In mechanism for forming hollow articles of plastic material, two confronting cavitary dies adapted to clamp two sheets of stock between them with the margins of the stock in air-tight engagement with each other, and a circular member insertible into the space between the dies and between the stock and withdrawable therefrom while the dies are closed and the sheets of stock are in contact with each other, said circular member having a series of recesses or pockets formed therein adapted to receive gas-forming material, the member being shiftable to discharge the gas-forming material onto the lower sheet of stock.

14. A mechanism for forming hollow articles of plastic material including two confronting cavitary dies adapted to clamp two sheets of stock between them and press the margins of the sheets into air-tight engagement with each other, a member insertible into the space between the dies and between the stock and withdrawable from between the sheets of stock without further separating the dies, the member having cavities disposed in alignment with each die cavity, and a sleeve surrounding the member and having openings, the sleeve and member being relatively rotatable to bring the cavities of the member into coincidence with the openings in the sleeve to thereby discharge gas-forming material onto the lower sheet.

15. A mechanism for forming hollow articles of plastic material including two confronting cavitary dies adapted to clamp two sheets of stock between them and press the margins of the sheets into air-tight engagement with each other, an air tube disposable in the space between the dies and between the sheets of stock and withdrawable axially from between the sheets while the dies are closed and the sheets of stock are in contact with each other, the air tube being adapted to be connected to a source of air under pressure.

16. A mechanism for forming hollow articles of plastic material including two confronting cavitary dies adapted to clamp two sheets of stock between them and press the margins of the sheets into air-tight engagement with each other, an air tube insertible through one side of the dies into the space between the dies and between the sheets of stock, a dropping member insertible through the other side of the dies and between the sheets of stock, the dropping member and the tubular member having coacting terminal portions, the dropping member and the tubular member being withdrawable from between the dies without further separating the dies and the dropping member being formed with a plurality of pockets, one for each of the die cavities, and adapted to contain gas-forming material, means for causing air to pass into the air tube to thereby force the sheets of stock into the opposed die cavities, and means whereby the dropper may be then shifted to discharge the gas-forming material into the cavities formed in the lower sheet of stock, the air tube and the dropper being axially shiftable in opposite directions to withdraw them from between the dies and between the sheets while the dies are closed and the sheets of stock are in contact with each other.

17. In mechanism for forming hollow articles of plastic material, two confronting cavitary dies adapted to clamp two sheets of stock between them and press the margins of the sheets into air-tight engagement, an air tube insertible into the space between the dies and between the sheets of stock and having means whereby it may be connected to a source of air under pressure, the air tube being withdrawable from between the sheets without necessitating the further separation of the dies, and a dropping member disposable between the sheets of stock and having pockets adapted to contain gas-forming material, the dropping member being shiftable in one direction to cause the gas-forming material to drop onto the lower sheet opposite each of the cavities in the die and being longitudinally shiftable to remove it from between the sheets and the dies while the dies are closed and the sheets of stock are in contact with each other.

18. In mechanism for forming hollow articles of plastic material, two confronting cavitary dies adapted to clamp two sheets of stock between them to press the margins of the sheets into air-tight engagement with each other, each of said dies having a stock-engaging marginal element, opposite portions of the marginal element being cut away to form oppositely disposed aligning seats, an air tube insertible through one of said seats into the space between the dies and sheets of stock, and a dropping member insertible through the other seat and having a pocket for each cavity of the die, the pocket being adapted to contain gas-forming material, both the air tube and the dropping member being axially shiftable from between the dies and sheets while the dies are closed and the sheets of stock are in contact with each other, the dropping member being rotatable to drop the gas-forming material into the cavities formed in the lower sheet of stock.

19. In mechanism for forming hollow articles of plastic material, two confronting cavitary dies adapted to clamp two sheets of stock between them to press the margins of the sheets into air-tight engagement with each other, each of said dies having a stock engaging marginal element, opposite portions of the marginal element being cut away to form oppositely disposed aligning seats, an air tube insertible through one of said seats into the space between the dies and sheets of stock, and a dropping member insertible through the other seat and having a pocket for each cavity of the die, the pocket being adapted to contain gas-forming material, both the air tube and the dropping member being axially shiftable from between the dies and sheets while the dies are closed and the sheets of stock are in contact with each other, the dropping member being rotatable to drop the gas-forming material into the cavities formed in the lower sheet of stock, the dropping member having a sleeve formed with apertures coinciding with the pockets, the sleeve and dropping member being relatively rotatable whereby to discharge the gas-forming material from the dropping member into the cavities of the lower sheet.

20. Means for dropping a gas-forming material into the depressions preformed in the sheet of plastic material for the purpose of forming hollow articles comprising a cylindrical member formed at intervals with pockets coinciding with the cavities in the preforming dies, a sleeve surrounding and forming part of said member and having downwardly disposed apertures, the member being rotatable within the sleeve to cause the pockets to coincide with the apertures and discharge gas-forming material therethrough, the member having a handle and a sleeve, and a stop to limit the rotation of the member to a position where the apertures and pockets are in registration.

21. Means for disposing gas-forming material upon a lower sheet of stock disposed against a cavitary die comprising a plurality of dropping members adapted to be disposed between the sheets of stock and project out of said dies, a yoke connecting all of said dropping members, a sleeve on each dropping member having apertures the same in number as the cavities in the die, the dropping member having pockets coinciding with the apertures, the apertures in the sleeve being normally directed downward, and means whereby each of said members may be rotated to bring the pockets into coincidence with the downwardly discharging apertures to thereby discharge gas-forming material onto the rubber sheet.

22. A mechanism for forming hollow articles of plastic material including two confronting cavitary dies, each having marginal stock-engaging clamps adapted to press the margins of the sheets into air-tight engagement with each other, each of said clamps having a plurality of oppositely disposed recesses, a plurality of connected air tubes insertible through the recesses in one flange of both dies, the connected air tubes being connected to a source of air under pressure and each tube at its end having a discharge outlet and being formed with an axially extending socket, a plurality of dropping members insertible through the opposite recesses in the stock-engaging clamps of the two dies and having their inner ends formed to engage in the sockets of the tubes, each of said dropping members having a plurality of pockets adapted to coincide with the several die cavities and each including a sleeve surrounding the corresponding member and having apertures in line with said pockets and discharging downwardly whereby when each of said members is turned to a certain position the pockets will discharge their contents through the apertures in the sleeves onto the plastic sheet immediately above a die cavity, and means exterior to the dies for operating said dropping members and controlling the admission of air to the air tubes, said members being withdrawable from between the dies after the dies have been pressed together and while the dies are closed and the sheets of stock are in contact with each other.

23. In a mechanism for forming hollow articles of plastic material, two confronting cavitary dies, each of said dies having a frame surrounding and fitting the exterior of the die, and springs urging said frame outward, the frame constituting a flange on the die and the opposed portions of the frame being adapted to clamp the sheets of stock between them.

24. In mechanism for forming hollow articles of plastic material, two confronting cavitary dies, each die being formed at its base with an outwardly projecting rigid flange, a frame fitting the exterior of each die and slidable axially of the die and constituting a flange for the die, these flanges being adapted to clamp two sheets of stock between them, and springs urging said frames toward each other.

25. In mechanism for forming hollow articles of plastic material, two confronting cavitary dies, each die being formed at its base with an outwardly projecting rigid flange, a frame fitting the exterior of each die and slidable axially of the die and constituting a flange for the die, these flanges being adapted to clamp two sheets of stock between them, and springs urging said frames toward each other, each of said frames being formed with confronting recesses, and a member adapted to be inserted through said recesses into the interior of the die and between the sheets and being removable through said recesses without further separating the dies.

26. In mechanism for forming hollow articles of plastic material, two confronting cavitary dies, each die being formed at its base with an outwardly projecting rigid flange, a frame fitting the exterior of each die and slidable axially of the die and constituting a flange for the die, these flanges being adapted to clamp two sheets of stock between them, springs urging said frames toward each other, each of said frames being formed with confronting recesses, a dropping member insertible through confronting recesses on one side of the dies into the space between the sheets, and an air tube insertible through said recesses on the opposite side of the die and into said space and provided with means exterior to the die whereby the admission of air to the interior of the die may be controlled, the dropping member having means whereby after air has been forced into the interior of the die, gas-forming material may be dropped into the cavities formed in the sheets.

27. In mechanism for forming hollow articles of plastic material, two opposed confronting cavitary dies, each die having a plurality of cavities and each cavity being defined by a projecting rib having a cutting edge, each die having at its base a laterally projecting wall, a frame fitting the exterior of each die and movable toward or from said wall, and springs resting at one end against the base of the die and at the other end against said frame and urging said frame outward to constitute a marginal flange on the die body.

In testimony whereof I hereunto affix my signature.

JOHN H. OVERTON.